US012528720B2

(12) United States Patent
Wright (10) Patent No.: US 12,528,720 B2
(45) Date of Patent: Jan. 20, 2026

(54) SYSTEMS, APPARATUS, AND METHODS FOR ALGAE CONTROL SYSTEM USING A CARBON NANOTUBE SONIC GENERATOR

(71) Applicant: John Wright, Provo, UT (US)

(72) Inventor: John Wright, Provo, UT (US)

( * ) Notice: Subject to any disclaimer, the term of this patent is extended or adjusted under 35 U.S.C. 154(b) by 697 days.

(21) Appl. No.: 17/823,720

(22) Filed: Aug. 31, 2022

(65) Prior Publication Data
US 2023/0067138 A1   Mar. 2, 2023

Related U.S. Application Data

(60) Provisional application No. 63/260,800, filed on Aug. 31, 2021.

(51) Int. Cl.
*C02F 1/34*     (2023.01)
*C02F 1/00*     (2023.01)
*C02F 103/00*   (2006.01)
*H04R 1/32*     (2006.01)
*H04R 3/02*     (2006.01)
*H04R 23/00*    (2006.01)

(52) U.S. Cl.
CPC ............... *C02F 1/34* (2013.01); *C02F 1/008* (2013.01); *H04R 1/323* (2013.01); *H04R 3/02* (2013.01); *H04R 23/002* (2013.01); *C02F 2103/007* (2013.01); *C02F 2303/04* (2013.01)

(58) Field of Classification Search
CPC ...... C02F 1/34; C02F 1/008; C02F 2103/007; C02F 2303/04; C02F 3/322; H04R 1/323; H04R 3/02; H04R 23/002; H04R 1/44
See application file for complete search history.

(56) References Cited

U.S. PATENT DOCUMENTS

2016/0037267 A1* 2/2016 Aliev ................... H04R 23/002
                                                    977/932
2023/0067138 A1* 3/2023 Wright .................... C02F 1/008

FOREIGN PATENT DOCUMENTS

CN        104342359 A  *  2/2015
WO   WO-2008027142 A2  *  3/2008 .......... H01M 8/0668

* cited by examiner

*Primary Examiner* — Daniel Pihulic
(74) *Attorney, Agent, or Firm* — Steve Hassid; Partners Law Group (57) ABSTRACT

An underwater sound generation device may be used for effective control of algae and other microorganisms in ponds and lakes. The sound projector may comprise a thermoacoustic sound transducer and an electronic unit for controlling the operation of the projector. The thermoacoustic projector may include a freestanding carbon nanotube (CNT) film encapsulated between two vibrating plates. The inert gas filled thin acoustical cavity provides a piston-type displacement of the plates and supports a high-temperature operation. A power supply driver, controlling the operation of the sound radiating system, may include a pulse generator, high-power switch amplifier, and a cable, connecting the projector with an electronic driver. The sound control system may provide an omnidirectional sound pressure level in a wide frequency range to affect the algae growth ecosystem over large distances.

19 Claims, 10 Drawing Sheets

SYSTEMS, APPARATUS, AND METHODS FOR ALGAE CONTROL SYSTEM USING A CARBON NANOTUBE SONIC GENERATOR

RELATED APPLICATIONS

This application claims priority to and the benefit of U.S. Provisional Patent Application No. 63/260,800, filed Aug. 31, 2021, which is hereby incorporated by reference herein in its entirety.

TECHNICAL FIELD

The present disclosure relates to algae control and more specifically to suppression of algae growth using a carbon nanotube-based sound generator.

BACKGROUND

Algal blooms are a naturally occurring phenomenon which occur in both freshwater and saltwater. Algae is a large, diverse group of photosynthetic organisms that often thrive in a water environment. Due to excess nutrient loading in water bodies (e. g. agricultural runoff and industrial activities), harmful algal blooms have become an increasing issue globally, and can even cause health effects in humans due to the release of cyanotoxins.

Numerous studies have proven that pre-treatment with pre-oxidants such as chlorine, chlorine dioxide, ozone, or permanganate can control the massive growth of harmful microorganisms. However, some pre-oxidants stimulate the release of microcystins from algae cells into water, while others may accelerate the formation of disinfection by-products.

DETAILED DESCRIPTION

A detailed description of systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Techniques, apparatus, and methods are disclosed that enable an underwater sound generation device for use for effective control of algae and other microorganisms in ponds and lakes. The sound projector may comprise a thermoacoustic sound transducer and an electronic unit for controlling the operation of the projector. The thermoacoustic projector may include a freestanding carbon nanotube (CNT) film encapsulated between two vibrating plates. The inert gas filled thin acoustical cavity provides a piston-type displacement of the plates and high-temperature operation. A power supply driver, controlling the operation of the system, may include a pulse generator (enabled to control the frequency of the sound projector using feedback control) high-power switch amplifier, and a cable, connecting the projector with an electronic driver. The sound control system may provide an omnidirectional sound pressure level (e.g., >170 dB re 1 µPa @ 1 m, in wide frequency range, 100-10000 Hz) to affect the algae growth over large distances (e.g., >1 km).

An algae growth control system may use periodical agitation of living the environment of biological microorganisms in water using a high-power, low-frequency sound. The algae control system may emit a low-frequency sound that vigorously agitates and disturbs the living environment of microorganisms and causes an internal distortion of living cells, thereby suppressing a growth of cells, and killing the organisms.

The algae control system may include a thermoacoustic (TA) sound transducer and an electronic driver for controlling the operation of the TA projector. These two units may be connected through a low-frequency (<1 MHz), high-ampacity (>20 A) cable with desired length. The TA projector may be placed into a plastic protective case and configured to be positioned stationary in water, using a float that suspends a TA projector below the water surface, or moved along the walls of a pool or pond, when attached to a long telescopic pole.

The TA projector in one configuration may include a freestanding carbon nanotube (CNT) film encapsulated between two vibrating plates (double-sided projector). The two symmetrically vibrating plates may provide an omnidirectional sound pressure diagram in a water body. This symmetrical vibrating plate configuration may be used for a suspended configuration of TA projector. In another configuration the CNT film may be encapsulated between a single vibrating plate (single-sided projector) and a backing holder (heatsink). The single vibrating plate may be used for positioning the projector on a bottom of a pond or to a wall of the swimming pool.

The freestanding CNT film, attached to the thin-plate assembly of interdigitated electrodes, may be suspended between two vibrating (or single vibrating) plate and heatsink based on a distance of a thermal diffusion length. The thin, flat cavity may be filled with inert gas. Rigid vibrating plates may create a coupled acoustical system determining the resonance frequency and the vibrational modes of the projector. The strong coupling and inert gas medium may provide a piston-type displacement of the plates and high-temperature operation condition.

A power supply driver, controlling the operation of the projector, may contain a pulse generator, enabling control of the frequency of the sound projector using a feedback control, pulse width controlling circuitry, high-power, switch-type amplifier, and/or a cable, connecting sound projector with electronic driver. The projector may provide an omnidirectional sound pressure diagram, high sound pressure level (e.g., SPL>170 dB re 1 µPa @ 1 m) in a wide frequency range (e.g., 100-10000 Hz) to suppress the algae growth for a distance. The power supply driver may provide a pulse width modulated signal to select approximately a resonance frequency of at least one plate (e.g., within 20%, 10%, 5%, 1%, 0.1% or 0.01% of a resonance frequency of the at least one plate).

The short-pulse excitation, combined with strong coupling of a gas-enclosed cavity and vibrating plate, may create a wide-band sound spectrum. This wide-band sound spectrum may cause a strong interference of the acoustical waves, resulting in a vigorous agitation of the water medium. This agitation may substantially disturb and/or suppress the biological life of microorganisms in water.

Figure 1:
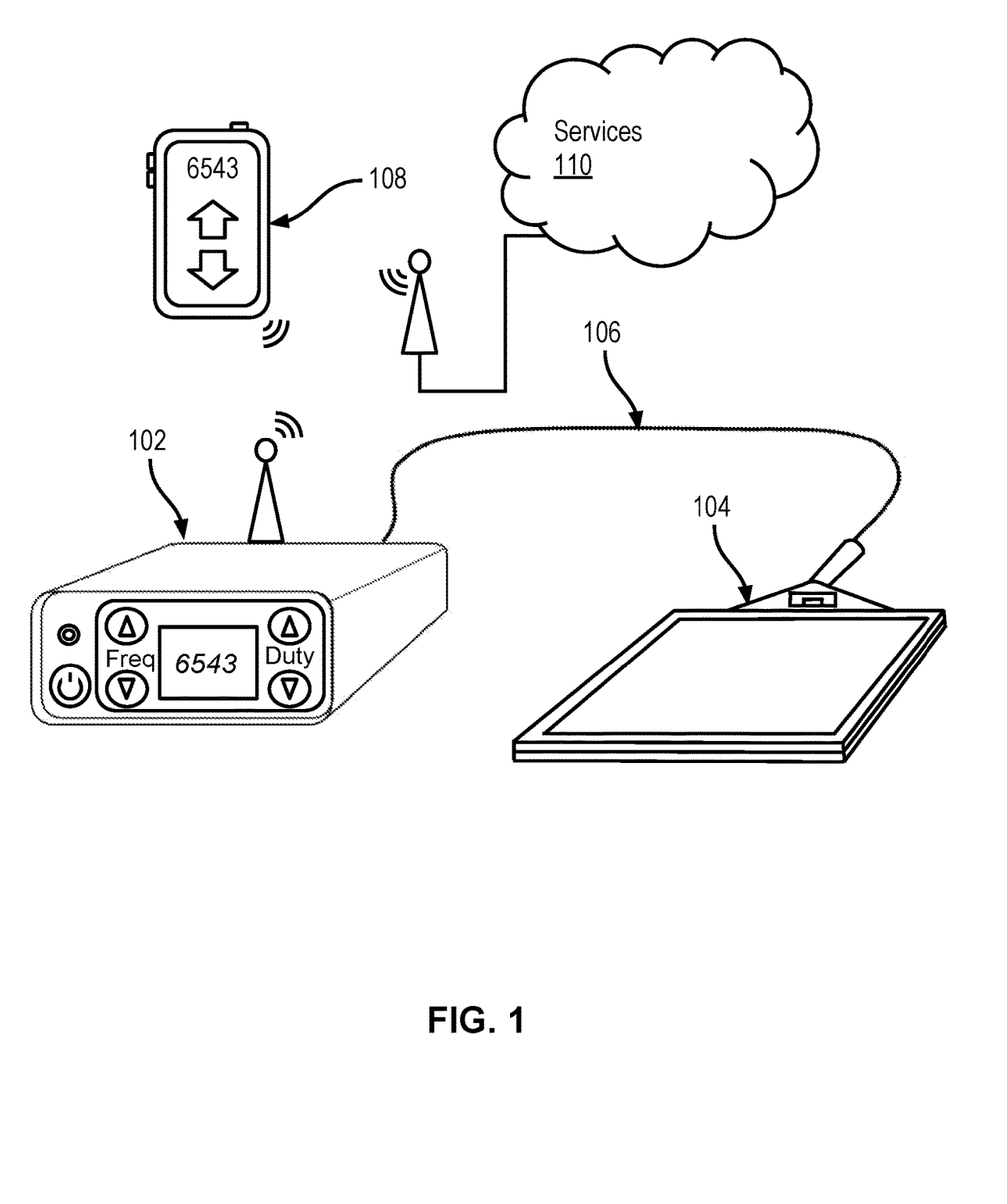
FIG. 1 shows a schematic illustration of an algae control system.
Figure 2:
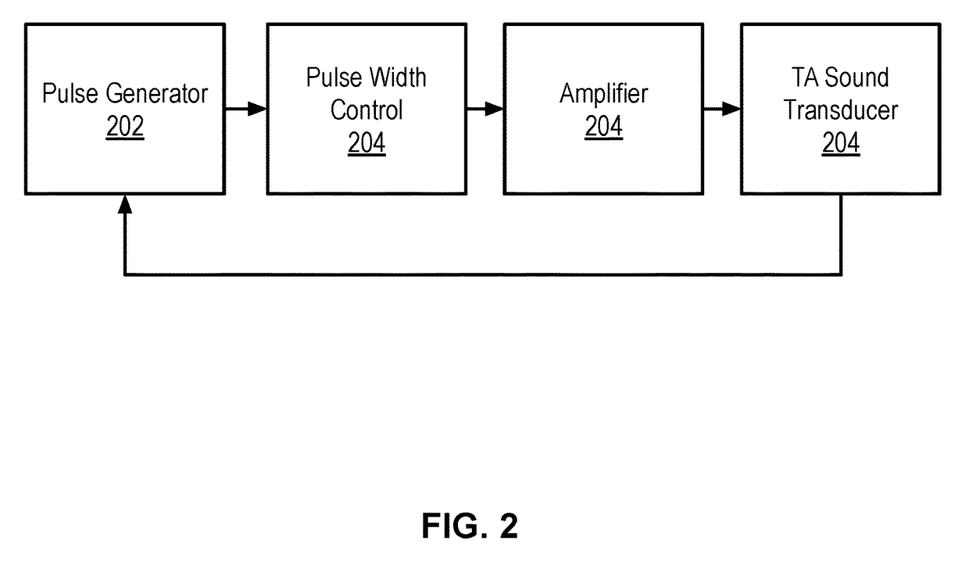
FIG. 2 shows a block diagram of a switch mode power supply driver.
Figure 3:
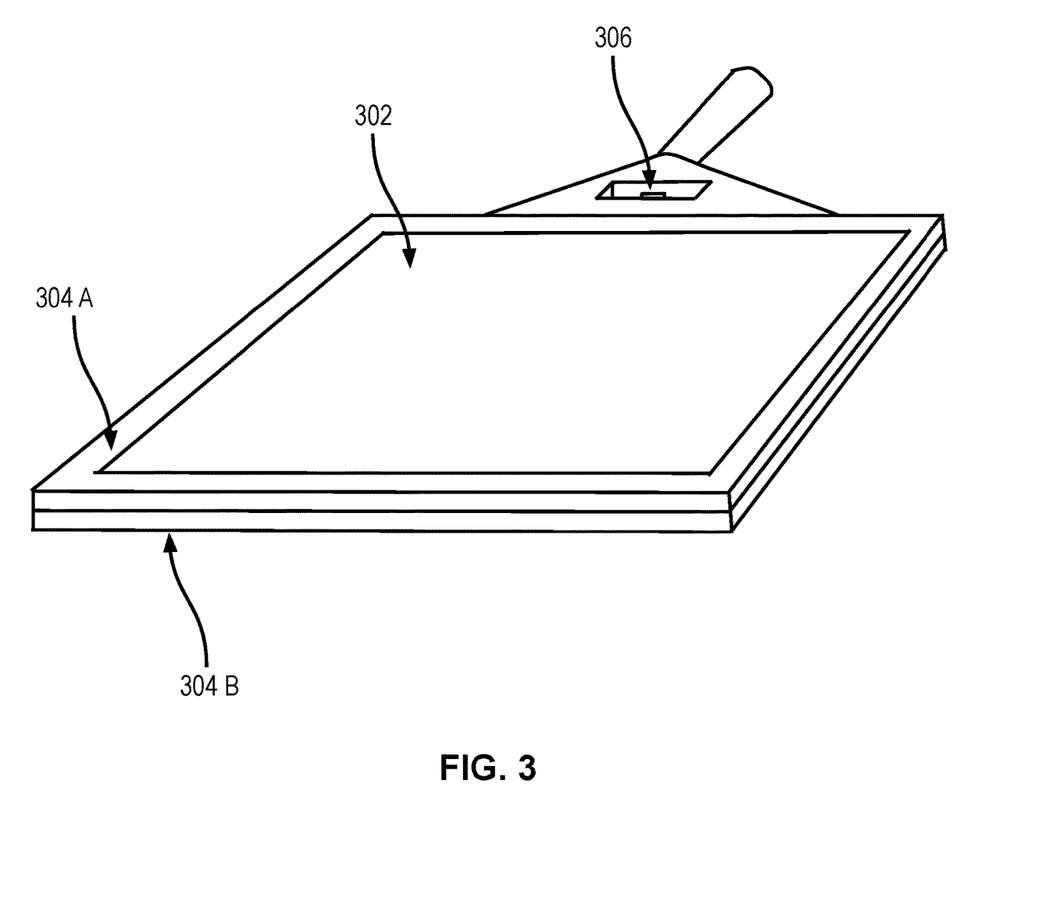
FIG. 3 shows a schematic illustration of a thermoacoustic sound projector.

High power ultrasonic irradiation may break down gas vesicles in algae cells, disrupting the cell wall and membrane, interrupting photosynthetic activity, and/or inhibiting the cell division and the cell cycle. These cell disturbances may enable controlling algal growth. Ultrasonic irradiation (e.g., at 640 kHz and higher frequencies) may cause the rapid degradation of microcystin-LR (a cyanobacterial toxin). Such treatments may be considered environmentally friendly and have undergone rapid development in recent years.

Higher frequencies and densities may be effective for inhibiting cyanobacteria than lower frequencies and densities. However, higher frequency ultrasound may decline faster with distance, and higher densities may consume more power and/or may be less cost efficient. For the field application of ultrasonic control of algae bloom, factors that may be considered include: the absorption of high-frequency sound waves in water, effective distances, and/or the energy consumption. From an environmental point of view, the release of toxins (e.g., microcystin, etc.) may be a concern for disruption of the algae cell.

Wide-band, low-frequency, high-density, short-duration sound pulses may be used to treat algae-containing water bodies. A mechanism reducing the algae growth may be a mechanical (acoustical) distortion of the algae growth environment.

An average size of algae type microorganisms thriving in a still water of ponds and/or lakes may be 1-5 μm. To disrupt the algae cells by resonance excitation, a high-frequency ultrasonic irradiation may be used, (e.g., $f_r$=0.65-3 MHz). Such ultrasonic sound pressure waves may rapidly decay in water due to a strong absorption (e.g., 3 dB per meter at 3 MHz):

$$p=p_0 \exp(-\alpha x)$$

Where $p_0$ is the far field sound pressure at the source, $\alpha$ is the absorption coefficient of sound in water for a given frequency, and x is the distance. The absorption coefficient may increase with frequency as a square of applied ultrasound frequency:

$$\alpha = \frac{2\pi^2 f^2}{c^3\rho}\left(\frac{4}{3}\eta + \frac{\gamma-1}{C_p}K\right)$$

Where f is the frequency, c is the velocity of sound waves in water, $\rho$ is the density of water, $\eta$ is the viscous coefficient of the medium, $\gamma$ is the heat capacity ratio, K is the thermal conductivity of water, and $C_p$ is the specific heat capacity of water at a constant pressure. This equation may indicate that higher frequencies correspond to a greater absorption of ultrasonic energy, a faster attenuation in water, and/or shorter propagation distances. For example, at a frequency of 3 MHz the sound pressure intensity may decrease twice per meter, $\alpha$=3 dB/m.

Algae removal time may decrease five times for 1320 kHz compared to 20 kHz at the same electrical power applied to the device. The removal rate may be about linearly increases with applied power. Low-frequency, high-power, short-pulse sonication (e.g., 0.5 s sound alternating with 2 s pause) may deliver more acoustical energy to longer distances and strongly affect microorganism life in a large water reservoir, such as through the mechanical impact on the water.

An apparatus for algae control may include one or more projectors powered by an electronic driver. The electronic driver may generate a sequence of rectangular pulses that actuate a temperature modulation on the surface of free-standing CNT film. The temperature modulation within a closed cavity may create a modulation of pressure of the enclosed gas according to the ideal gas law. The modulated pressure may exert a periodical force on the plates encapsulating the carbon nanotube film and may induce a vibration of the rigid plates, which may create sound waves in an outer surrounding medium. The sound waves may mechanically disturb the bioenvironment of microorganisms in water at appropriate frequencies and sound power.

FIG. 1 shows a schematic illustration of an algae control system. The algae control system may include a power supply driver and/or thermoacoustic (TA) sound projector. The power supply driver may be connected to the TA sound projector through the two-wire cable enabling it to transfer the electrical current up to 20 A and/or withstand electrical voltages up to 300 V.

The power supply driver may be automatically and/or manually controlled. For example, the power supply driver may include settings that may be manually changed. The settings may reflect direct electrical measurements, such as frequency, power, etc. The settings may reflect desired targets, such as algae, type of algae, multiple types of algae, plant targets, bacterial targets, etc. Using the desired targets, the power supply driver may set electrical configurations that are configured to disrupt the targets. The settings may reflect desired outcomes, such as algae removal over a period of time, seasonal use, periodic use, regular cleaning when unoccupied, etc.

In some embodiments, the algae system may communicate via a wired or wireless network. The algae system may receive instructions, settings, and/or configurations from a mobile device or a network service. The algae system may periodically communicate with the network service and/or mobile device to receive updates or changes to the instructions, settings, and/or configurations. The network service may compute a set of configurations to provide to the algae system over time, and then send updates to the algae system based on the computed set of configurations.

FIG. 2 shows a block diagram of a switch mode power supply driver. The power supply driver may contain a pulse generator (enabling control the frequency at the output power of the sound projector using a feedback control), pulse width controlling circuitry, high-power, switch-type amplifier, and/or a cable, connecting the TA projector with electronic driver FIG. 3 shows a schematic illustration of a TA sound projector. The TA sound projector may be protected in a plastic case. The TA projector may include a freestanding CNT film encapsulated between two identical vibrating plates (double-sided projector). The two symmetrically vibrating plates may provide an omnidirectional sound pressure diagram in a water body. The TA projector may be used in a suspended configuration.

Figure 4:
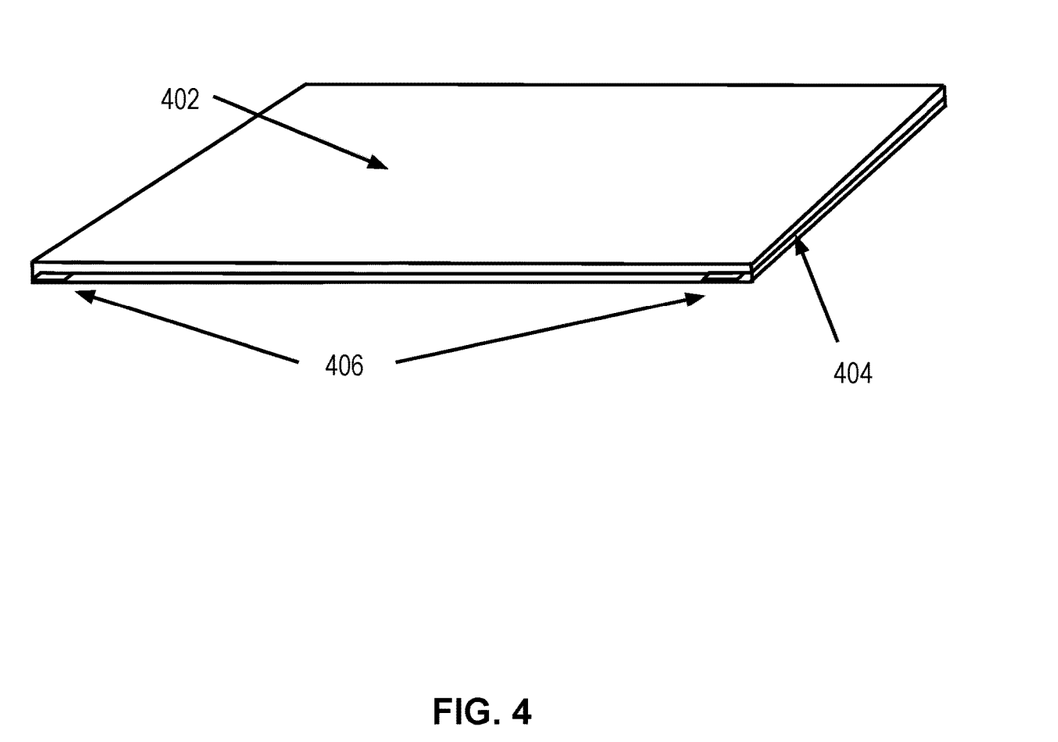
FIG. 4 shows a schematic illustration of a double-sided thermoacoustic sound projector.

FIG. 4 shows a schematic illustration of a double-sided thermoacoustic sound projector. A double-sided TA sound projector is shown without a plastic case. The plastic case may include two plastic frames glued together with TA projector peripherally by silicone paste. The holder may serve to suspend the projector in a water body or to secure the projector to a telescopic pole.

Figure 7:
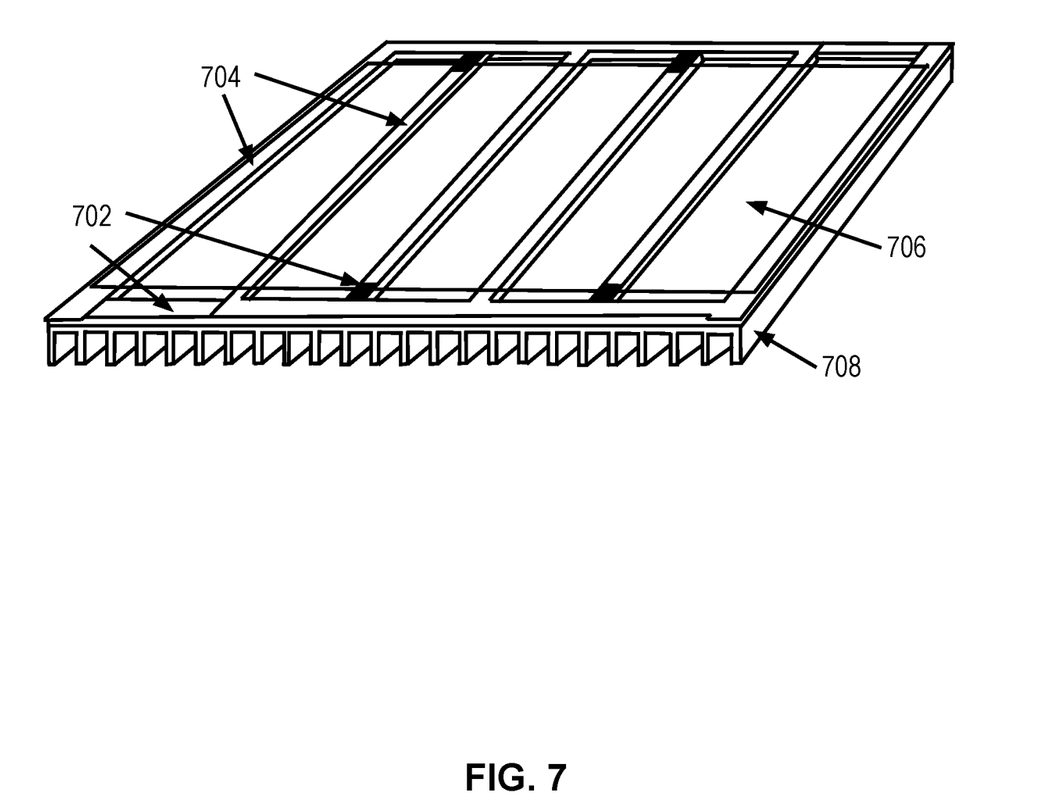
FIG. 7 shows a schematic illustration of a single-sided projector.

In some embodiments, the CNT film may be encapsulated between a single vibrating plate (single-sided projector) and a backing holder (heatsink). This embodiment may be used for positioning the projector on the bottom of a pond or to the wall of the swimming pool.

Figure 5:
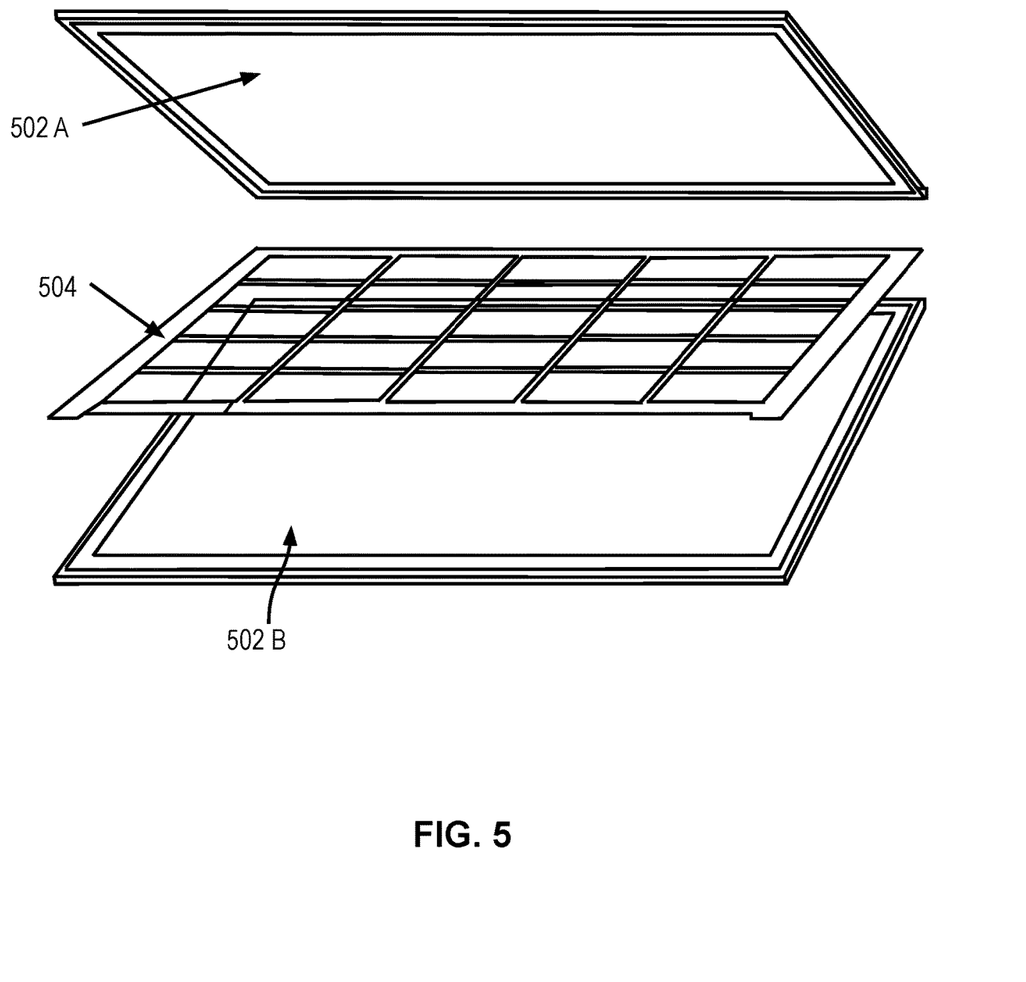
FIG. 5 shows an exploded view of the double-sided thermoacoustic sound projector.

FIG. 5 shows an exploded view of the double-sided thermoacoustic sound projector. The double-sided TA sound projector may include the CNT film deposited on an interdigitated electrode frame from both sides, and/or two vibrating plates encapsulating the CNT heater using soft silicone spacers. The thickness of silicone spacers may determine the thickness of the gas filled cavity. The thinner cavity may provide higher efficiency. A thin cavity may limit the displacement amplitude of the plates. To avoid direct heat dissipation from CNT film to the vibrating plates, the distance between CNT film and vibrating plate may be larger than the thermal diffusion length of thermal waves.

The resistance of single CNT sheet directly withdrawn from the chemical vapor-deposition grown forest may be too high (~1000Ω) for commercial input impedance standards of loudspeakers and underwater sonars. To reduce the impedance per square film, several layers of CNT sheets may be superimposed. This measure may partially reduce a resistance per square but may substantially deteriorate an exchange coefficient between the CNTs and surrounding gas.

Figure 6:
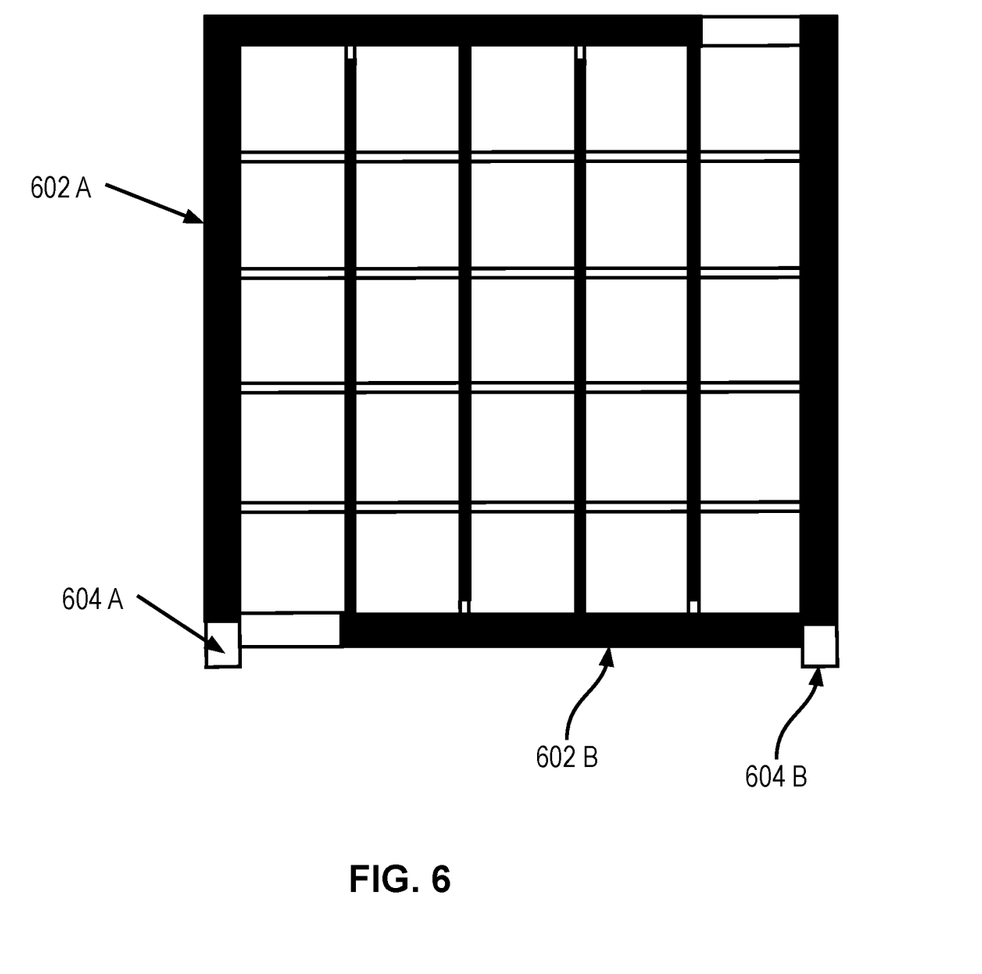
FIG. 6 shows a schematic illustration of an interdigitated electrode frame.

FIG. 6 shows a schematic illustration of an interdigitated electrode frame. Use of interdigitated electrodes may be used to create a desired input resistance. Interdigitated electrode frame may be used to support a freestanding, in-plane attached CNT heater. The shown five segment, comb-type copper electrode array, deposited on both sides of an insulating fiberglass-epoxy composite plate (Printed Circuit Board) may provide 8 Ohm input resistance when four layers of multiwalled CNT sheets are deposited on both sides of the frame.

To reinforce the input terminals mechanically, additional copper foil strips may be attached to both electrode ends (shown as pads). Since the heating mechanism of CNT may be resistive heating and/or the resistance of CNT may be Ohmic (e.g., no complex parts), both electrodes may be symmetrically equal. No polarity may be needed for connecting a cable.

In a double-sided projector, the interdigitated frame with attached CNT films may be fixed between two spacer frames (blue strips on inner sides of plates), placed on the inner sides of both vibrating plates peripherally. The electrode frame may be suspended between the two plates.

FIG. 7 shows a schematic illustration of a single-sided projector. An interdigitated electrode frame may be directly glued on a heatsink, and/or the projector's backing holder through insulating spacers (e.g., silicone strips). The CNT film may be attached to a top of planar interdigitated electrodes using a vapor (e.g., methanol, ethanol, acetone, toluene, etc.) densification of CNTs on a top surface of metallic electrodes.

Figure 8:
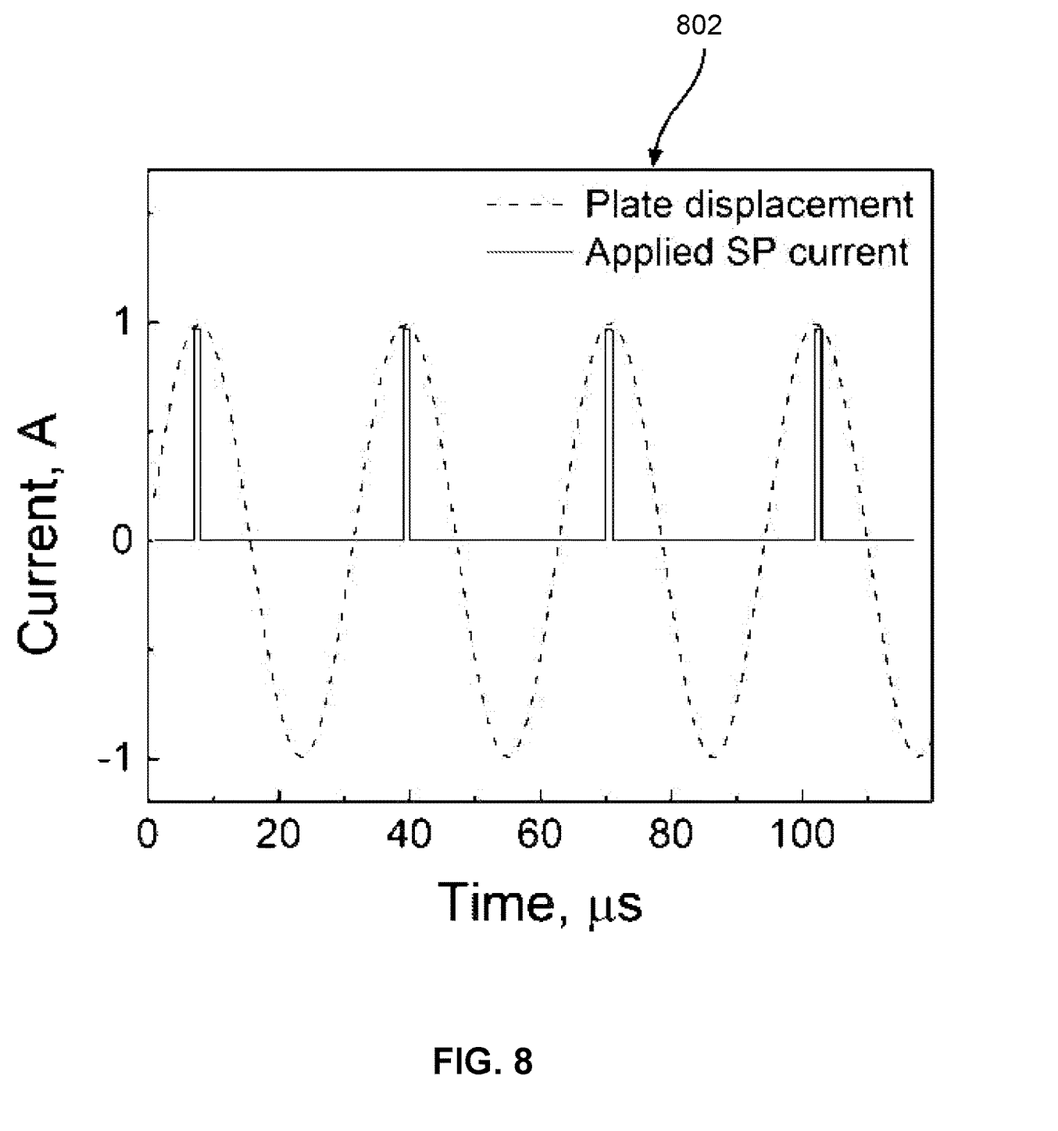
FIG. 8 shows a diagram of a periodic train of short pulses applied to a freestanding carbon nanotube (CNT) heater, and a displacement of vibrating plates.

FIG. 8 shows a signal shape diagram of a short-pulse, constant amplitude excitation (e.g., current, voltage, etc.) of a nanostructured CNT heater, and a displacement of vibrating plates. The use of short pulses, instead of sine excitation, may substantially enhance energy conversion efficiency of the TA sound transducer. The pulse duty cycle may be adjusted such that after each short pulse, the system (e.g., carbon nanotube heater and filled gas) may have ample time to cool down to near room temperature. A large temperature gradient and high Carnot's cycle efficiency may be preserved.

The use of short-pulse excitation of a CNT heater may not disturb a shape of an output sound wave. The thermal inertia of encapsulated gas and mechanical inertia of vibrating plates may result in a sine response of the vibrating plates and corresponding sound pressure in water. The spectrum of sound radiation may be broader due to a simultaneous excitation of vibrational harmonics (modes) by short pulses.

Figure 9:
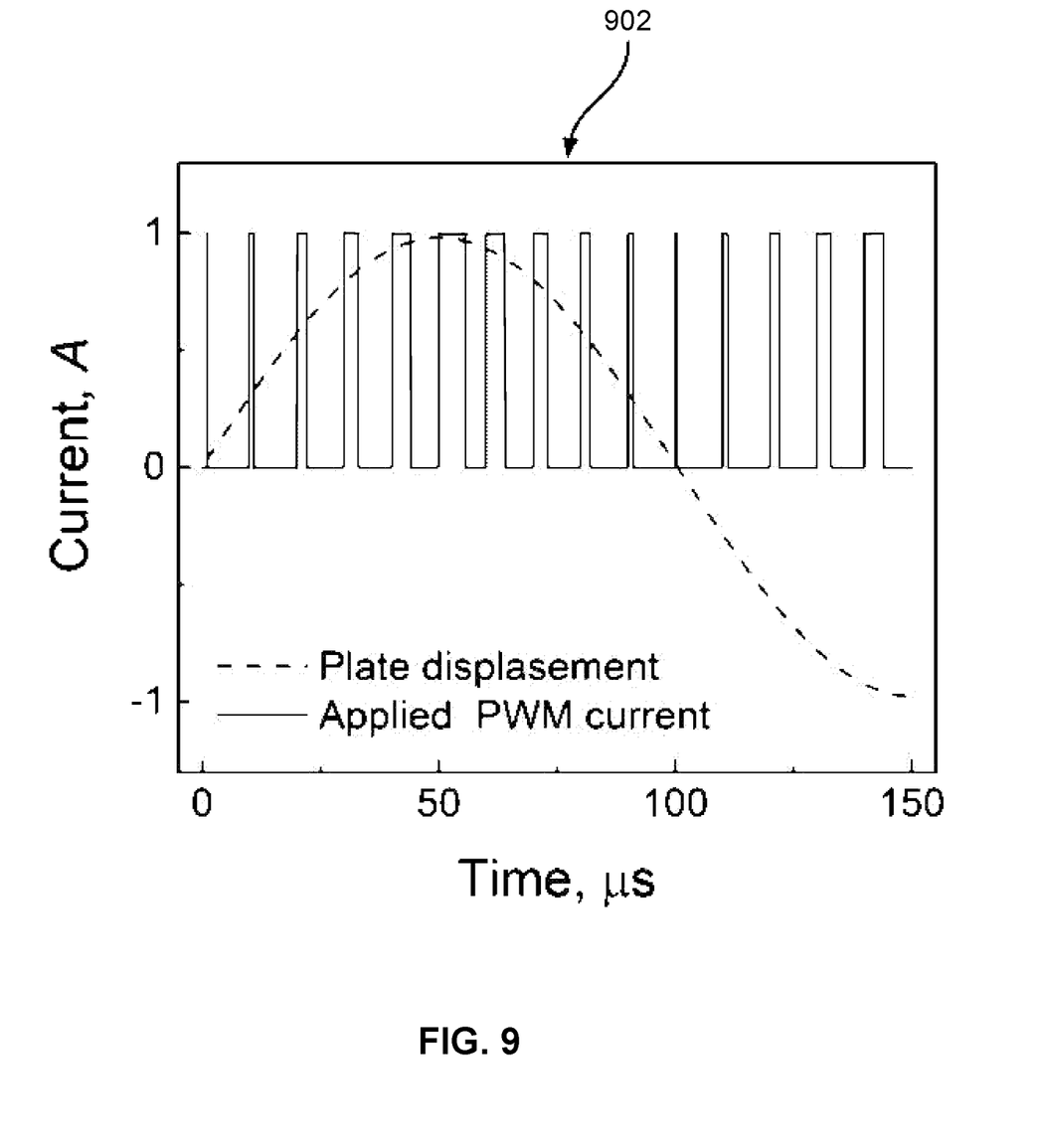
FIG. 9 shows a signal shape diagram of pulse-width modulated excitation of a nanostructured CNT heater, and a displacement of vibrating plates.

FIG. 9 shows a signal shape diagram of pulse-width modulated excitation of a nanostructured CNT heater, and a displacement of vibrating plates. For radiating a single harmonic sound wave at a given frequency with high fidelity, a pulse-width modulation (PWM) may be preferable. The width of electrical pulses shown may follow a sine function. The excitation of higher harmonic vibrations may be suppressed, while the energy conversion efficiency determined by the reduced average temperature of the filled gas may be preserved.

In addition to thermodynamic benefits of the short pulse excitation the electrical circuitry, generating high-power short pulses may also have multiple advantages compared to the sinusoidal output amplifiers. The switch-type short pulse amplifiers may have higher efficiency, compact electronic housing, and/or well developed (converters).

A double-sided TA projector excited by short electrical pulses may provide an omnidirectional sound pressure diagram, high sound pressure level (e.g., SPL>170 dB re 1 μPa @ 1 m) in a wide frequency range (e.g., 100-10000 Hz) to suppress the algae growth on the large distances (e.g., >1 km).

Figure 10:
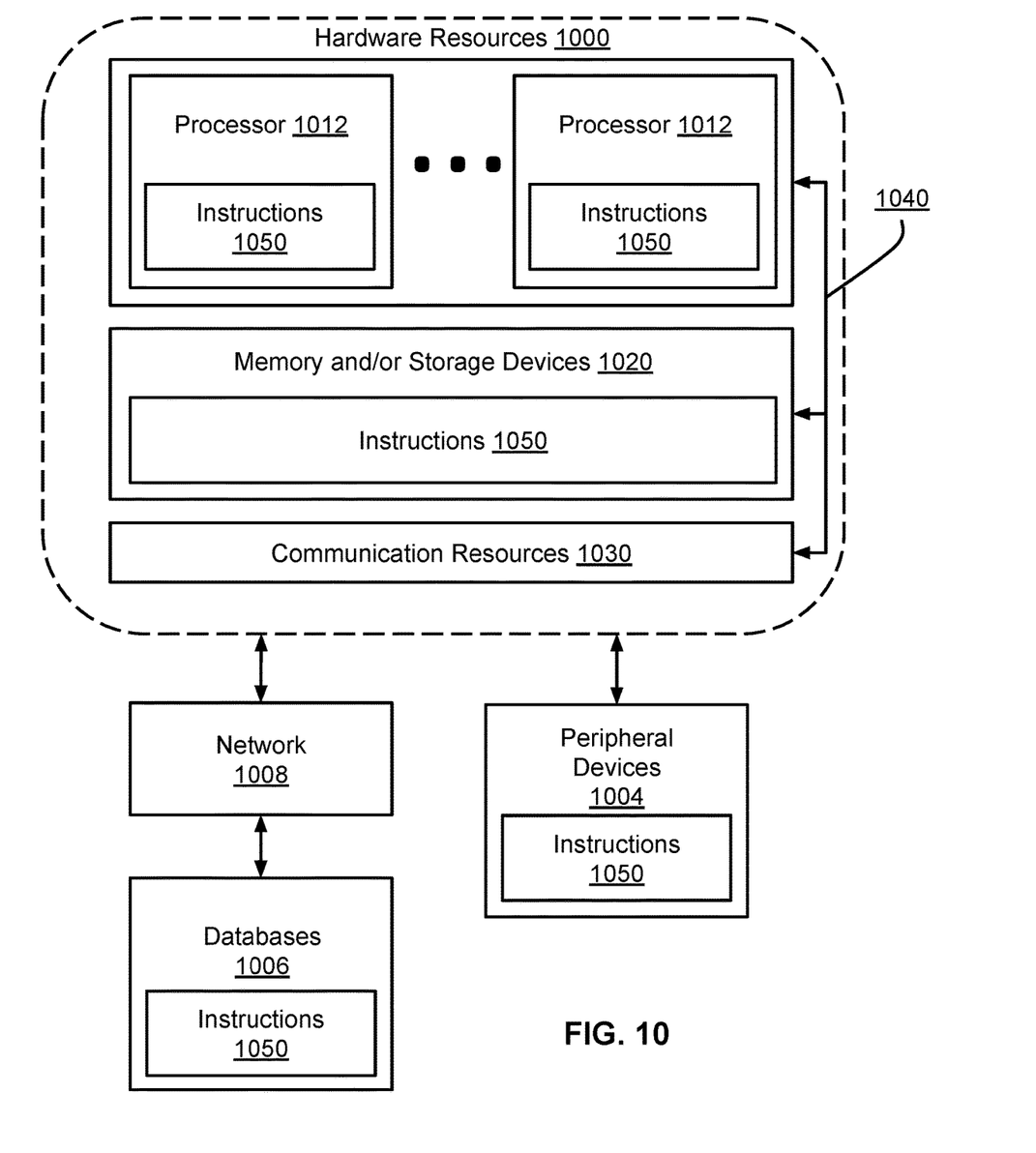
FIG. 10 is a block diagram illustrating a computing system and components.

FIG. 10 is a block diagram illustrating components, according to some example embodiments, able to read instructions from a machine-readable or computer-readable medium (e.g., a machine-readable storage medium) and perform any one or more of the methodologies discussed herein. Specifically, FIG. 10 shows a diagrammatic representation of hardware resources 1000 including one or more processors (or processor cores) 1010, one or more memory/storage devices 1020, and one or more communication resources 1030, each of which are communicatively coupled via a bus 1040.

The processors 1010 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1012 and a processor 1014. The memory/storage devices 1020 may include main memory, disk storage, or any suitable combination thereof.

The communication resources 1030 may include interconnection and/or network interface components or other suitable devices to communicate with one or more peripheral devices 1004 and/or one or more databases 1006 via a network 1008. For example, the communication resources 1030 may include wired communication components (e.g., for coupling via a Universal Serial Bus (USB)), cellular communication components, Near Field Communication (NFC) components, Bluetooth® components (e.g., Bluetooth® Low Energy), Wi-Fi® components, and other communication components.

Instructions 1050 may comprise software, a program, an application, an applet, an app, or other executable code for causing at least any of the processors 1010 to perform any one or more of the methodologies discussed herein. The instructions 1050 may reside, completely or partially, within at least one of the processors 1010 (e.g., within the processor's cache memory), the memory/storage devices 1020, or any suitable combination thereof. Furthermore, any portion of the instructions 1050 may be transferred to the hardware resources 1000 from any combination of the peripheral devices 1004 and/or the databases 1006. Accordingly, the memory of processors 1010, the memory/storage devices 1020, the peripheral devices 1004, and the databases 1006 are examples of computer-readable and machine-readable media.

As used herein, the term "circuitry" may refer to, be part of, or include an Application Specific Integrated Circuit (ASIC), an electronic circuit, a processor (shared, dedicated, or group, (and/or memory) shared, dedicated, or group (that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

Computer systems and the computers in a computer system may be connected via a network. Suitable networks for configuration and/or use as described herein include one or more local area networks, wide area networks, metropolitan area networks, and/or Internet or IP networks, such as the World Wide Web, a private Internet, a secure Internet, a value-added network, a virtual private network, an extranet, an intranet, or even stand-alone machines which communicate with other machines by physical transport of media. In particular, a suitable network may be formed from parts or entireties of two or more other networks, including networks using disparate hardware and network communication technologies.

One suitable network includes a server and one or more clients; other suitable networks may contain other combinations of servers, clients, and/or peer-to-peer nodes, and a given computer system may function both as a client and as a server. Each network includes at least two computers or computer systems, such as the server and/or clients. A computer system may include a workstation, laptop computer, disconnectable mobile computer, server, mainframe, cluster, so-called "network computer" or "thin client," tablet, smart phone, personal digital assistant or other hand-held computing device, "smart" consumer electronics device or appliance, medical device, or a combination thereof.

Suitable networks may include communications or networking software, such as the software available from Novell®, Microsoft®, and other vendors, and may operate using TCP/IP, SPX, IPX, and other protocols over twisted pair, coaxial, or optical fiber cables, telephone lines, radio waves, satellites, microwave relays, modulated AC power lines, physical media transfer, and/or other data transmission "wires" known to those of skill in the art. The network may encompass smaller networks and/or be connectable to other networks through a gateway or similar mechanism.

Various techniques, or certain aspects or portions thereof, may take the form of program code (i.e., instructions) embodied in tangible media, such as floppy diskettes, CD-ROMs, hard drives, magnetic or optical cards, solid-state memory devices, a non-transitory computer-readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and nonvolatile memory and/or storage elements), at least one input device, and at least one output device. The volatile and nonvolatile memory and/or storage elements may be a RAM, an EPROM, a flash drive, an optical drive, a magnetic hard drive, or other medium for storing electronic data. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

Each computer system includes one or more processors and/or memory; computer systems may also include various input devices and/or output devices. The processor may include a general-purpose device, such as an Intel®, AMD®, or other "off-the-shelf" microprocessor. The processor may include a special purpose processing device, such as ASIC, SoC, SiP, FPGA, PAL, PLA, FPLA, PLD, or other customized or programmable device. The memory may include static RAM, dynamic RAM, flash memory, one or more flip-flops, ROM, CD-ROM, DVD, disk, tape, or magnetic, optical, or other computer storage medium. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, or off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Several aspects of the embodiments described will be illustrated as software modules or components. As used herein, a software module or component may include any type of computer instruction or computer-executable code located within a memory device. A software module may, for instance, include one or more physical or logical blocks of computer instructions, which may be organized as a routine, program, object, component, data structure, etc., that perform one or more tasks or implement particular data types. It is appreciated that a software module may be implemented in hardware and/or firmware instead of or in addition to software. One or more of the functional modules described herein may be separated into sub-modules and/or combined into a single or smaller number of modules.

In certain embodiments, a particular software module may include disparate instructions stored in different locations of a memory device, different memory devices, or different computers, which together implement the described functionality of the module. Indeed, a module may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

The system may be constructed in various ways, including the examples described below.

Example 1. An apparatus for controlling algae and other microorganism growth in ponds and lakes, said apparatus comprising: a sound transducer assembly configured to emit wide-band, omnidirectional sound waves, and a driver circuit electrically connected to said transducer assembly, said driver circuit exciting transducer assembly by short electrical pulses to activate a wide-band vibration of plates and consequent sound waves in water body to agitate the living environment of algae.

Example 2. The apparatus of Example 1, wherein said transducer assembly includes a thermoacoustic sound projector placed into a plastic protection case, said plastic frame with large open windows for free vibration of transducer plates.

Example 3. The thermoacoustic sound projector of Example 2, further comprising a freestanding carbon nanotube film encapsulated in an inert gas medium between two flat vibrating plates.

Example 4. The inert gas medium of Example 3, is chosen from the list of monatomic inert gases (argon, xenon), having a high heat capacity ratio, $\gamma=C_p/C_v$.

Example 5. The freestanding carbon nanotube film of Example 3 selected from a group of freestanding single-walled, few-walled, or multi-walled carbon nanotube films.

Example 6. The freestanding carbon nanotube film of Example 4 is attached to the interdigitated electrode frame.

Example 7. The electrode frame of Example 6, comprising a network of through rectangular holes, whereas the rigid borders between holes, comprising a plurality of deposited copper-electrode strips, serve as interdigitated electrodes for carbon nanotube film.

Example 8. The carbon nanotube film of Example 3, attached to the electrode frame by densification in volatile liquid vapors, is suspended between the vibrating plate and the baking heatsink (between two vibrating plates).

Example 8.5. The carbon nanotube film of Example 8, wherein the volatile liquid vapors comprise methanol, ethanol, acetone, or toluene.

Example 9. The carbon nanotube film of Example 3, comprising at least one layer, a plurality of superimposed layers, but less than four layers.

Example 10. The density of interdigitated electrodes of Example 7 and number of superimposed layers are chosen to adjust a desired input impedance of the transducer.

Example 11. The vibrating plate of Example 3 is chosen from the list of metallic plates based on mechanical strength, flexural rigidity, and density.

Example 12. The vibrating plate of Example 11 is selected from Magnesium alloy AZ31B, Aluminum alloy 7075-T6-Clad, or Titanium alloy.

Example 13. The driver circuit of Example 1, comprising: a pulse generator; a pulse width controlling unit; a high-power amplifier, and a feedback circuitry to control the resonance frequency of vibrating plates.

Example 14 The driver circuit of Example 1 enabling to generate a constant amplitude, single pulse per period electrical signal exciting the thermoacoustic sound projector at the frequency of the first vibrating resonance of the plate.

Example 15. The driver circuit of Example 1, enabling to generate a constant amplitude, multiple pulses per period with pulse width changing as a displacement of the vibrating plate.

Example 16. The apparatus of Example 1 wherein said driver circuit is controlling the power of output sound by changing the pulse width of electrical pulses.

Reference throughout this specification to "an example" means that a particular feature, structure, or characteristic described in connection with the example is included in at least one embodiment of the present invention. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such a list should be construed as a de facto equivalent of any other member of the same list solely based on its presentation in a common group without indications to the contrary. In addition, various embodiments and examples of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of materials, frequencies, sizes, lengths, widths, shapes, etc., to provide a thorough understanding of embodiments of the invention. One skilled in the relevant art will recognize, however, that the invention may be practiced without one or more of the specific details, or with other methods, components, materials, etc. In other instances, well-known structures, materials, or operations are not shown or described in detail to avoid obscuring aspects of the invention.

It should be recognized that the systems described herein include descriptions of specific embodiments. These embodiments can be combined into single systems, partially combined into other systems, split into multiple systems or divided or combined in other ways. In addition, it is contemplated that parameters/attributes/aspects/etc. of one embodiment can be used in another embodiment. The parameters/attributes/aspects/etc. are merely described in one or more embodiments for clarity, and it is recognized that the parameters/attributes/aspects/etc. can be combined with or substituted for parameters/attributes/aspects/etc. of another embodiment unless specifically disclaimed herein.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the invention is not to be limited to the details given herein, but may be modified within the scope and equivalents of the appended claims.

Those having skill in the art will appreciate that many changes may be made to the details of the above-described embodiments without departing from the underlying principles of the invention. The scope of the present invention should, therefore, be determined only by the following claims.

What is claimed:

1. An apparatus for controlling algae, comprising:
   a sound transducer assembly comprising a freestanding carbon nanotube film encapsulated in inert gas medium between at least two plates,
   wherein the sound transducer assembly is configured to emit wide-band, omnidirectional sound waves; and
   a driver circuit electrically connected to the sound transducer assembly,
   wherein the driver circuit is configured to excite the sound transducer assembly by short electrical pulses to activate a wide-band vibration of the at least two plates,
   wherein the driver circuit further comprises feedback circuitry to select approximately a resonance frequency of at least one of the at least two plates.

2. The apparatus of claim 1, wherein the freestanding carbon nanotube film comprises a freestanding single-walled carbon nanotube film, freestanding few-walled carbon nanotube film, or freestanding multi-walled carbon nanotube film.

3. The apparatus of claim 1, wherein the freestanding carbon nanotube film comprises less than four superimposed layers.

4. The apparatus of claim 1, wherein the freestanding carbon nanotube film is attached to an interdigitated electrode frame.

5. The apparatus of claim 1, wherein the sound transducer assembly comprises a network of rectangular through holes, wherein rigid borders between holes comprise a plurality of deposited copper-electrode strips that form interdigitated electrodes coupled to the carbon nanotube film.

6. The apparatus of claim 1, wherein the driver circuit further comprises feedback circuitry to select approximately a resonance frequency of the at least two plates.

7. The apparatus of claim 6, wherein the driver circuit comprises a pulse generator.

8. The apparatus of claim 7, wherein the driver circuit comprises an amplifier.

9. The apparatus of claim 8, wherein the driver circuit comprises a pulse width controlling unit.

10. The apparatus of claim 1, wherein the driver circuit generates a constant amplitude, multiple pulses per period to cause a displacement of the vibrating plate.

11. The apparatus of claim 1, wherein the driver circuit generates a constant amplitude, single pulse per period electrical signal exciting the thermoacoustic sound projector at approximately a frequency of a first vibrating resonance of the plate.

12. A system for algae control comprising:
    a sound projector comprising:
        a freestanding carbon nanotube film;
        two plates that form an acoustical cavity, wherein the freestanding carbon nanotube film is between the two plates; and
        an inert gas medium in the acoustical cavity;
    a controller electrically coupled to the sound projector, comprising:
        a pulse generator;
        a pulse width controlling unit electrically coupled to the pulse generator; and
        feedback circuitry coupled to the pulse width controlling unit and configured to control a frequency of vibration of the two plates.

13. The system of claim 12, wherein the pulse width controlling unit is configured to cause the pulse generator to generate a constant amplitude, single pulse per period electrical signal to excite the sound projector at approximately a frequency of a first vibrating resonance of at least one plate of the two plates.

14. The system of claim 12, wherein the pulse width controlling unit is configured to cause the pulse generator to generate constant amplitude, multiple pulses per period to cause a displacement of the vibrating plate.

15. A method for algae removal, the method comprising:
emitting wide-band, omnidirectional sound waves from a sound transducer assembly, the sound transducer assembly comprising a freestanding carbon nanotube film encapsulated in inert gas medium between at least two plates; and
exciting the sound transducer assembly by short electrical pulses to activate a wide-band vibration of the at least two plates, using a driver circuit electrically connected to the sound transducer assembly,
wherein the driver circuit further comprises feedback circuitry to select approximately a resonance frequency of at least one of the at least two plates.

16. The method of claim 15, wherein the freestanding carbon nanotube film comprises a freestanding single-walled carbon nanotube film, freestanding few-walled carbon nanotube film, or freestanding multi-walled carbon nanotube film.

17. The apparatus of claim 15, wherein the freestanding carbon nanotube film comprises less than four superimposed layers.

18. The apparatus of claim 15, wherein the freestanding carbon nanotube film is attached to an interdigitated electrode frame.

19. The apparatus of claim 15, wherein the sound transducer assembly comprises a network of rectangular through holes, wherein rigid borders between holes comprise a plurality of deposited copper-electrode strips that form interdigitated electrodes coupled to the carbon nanotube film.

* * * * *